(12) United States Patent
Sienko et al.

(10) Patent No.: US 9,979,533 B2
(45) Date of Patent: May 22, 2018

(54) DIFFERENTIATING-INTEGRATING SAMPLING DATA RECEIVER

(71) Applicant: QUALCOMM INCORPORATED, San Diego, CA (US)

(72) Inventors: Matthew David Sienko, San Diego, CA (US); Meysam Azin, San Diego, CA (US); Weibo Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/255,562

(22) Filed: Sep. 2, 2016

(65) Prior Publication Data
US 2018/0069691 A1    Mar. 8, 2018

(51) Int. Cl.
*H04L 7/02* (2006.01)
*H04L 7/00* (2006.01)
*H04L 25/06* (2006.01)

(52) U.S. Cl.
CPC .......... *H04L 7/0087* (2013.01); *H04L 25/069* (2013.01)

(58) Field of Classification Search
CPC ........................... H04L 7/0087; H04L 25/069
USPC ......................................................... 375/360
See application file for complete search history.

(56) References Cited

U.S. PATENT DOCUMENTS

| | | | |
|---|---|---|---|
| 4,019,153 A * | 4/1977 | Cox, Jr. ................. | H03H 17/02 327/12 |
| 4,084,196 A * | 4/1978 | Tisue ................... | H04N 1/4051 358/3.15 |
| 4,982,110 A | 1/1991 | Yokogawa et al. | |
| 5,901,188 A * | 5/1999 | Roither ................. | H04L 7/033 327/12 |
| 6,018,364 A | 1/2000 | Mangelsdorf | |
| 6,856,658 B1 | 2/2005 | Baba et al. | |
| 7,075,475 B1 | 7/2006 | Wan | |
| 7,091,751 B2 | 8/2006 | Roh et al. | |
| 7,679,540 B2 | 3/2010 | Ceballos et al. | |
| 9,134,824 B2 | 9/2015 | Kang et al. | |
| 2008/0310568 A1 * | 12/2008 | Sander ................... | G01R 23/15 375/355 |
| 2010/0020448 A1 * | 1/2010 | Ng ......................... | H01F 19/04 361/1 |
| 2010/0321072 A1 * | 12/2010 | Bauwelinck ............. | H04L 5/22 327/142 |

(Continued)

OTHER PUBLICATIONS

Cao S., et al., "A Reconfigurable Double Sampling Sigma Delta Modulator for 4G Mobile Terminals," 3rd International Congress on Image and Signal Processing (CISP2010), 2010, pp. 4328-4332.

(Continued)

*Primary Examiner* — Helene Tayong
(74) *Attorney, Agent, or Firm* — Smith Tempel Blaha LLC/Qualcomm

(57) ABSTRACT

A serial data receiver may include an edge detector and a digital integrator. The edge detector may be configured to provide one or more edge detection signals defining an edge detection indication in response to a comparison between two successive samples of a receiver input signal. The edge detection indication may represent a detected negative edge, a detected positive edge, or no detected edge. The digital integrator may be configured to provide a receiver output signal in response to integration of the one or more edge detection signals.

21 Claims, 8 Drawing Sheets

(56) References Cited

U.S. PATENT DOCUMENTS

2012/0049910 A1* 3/2012 Aoyama ................. H03L 7/089
 327/156
2013/0258312 A1* 10/2013 Lewis ................... G01S 7/4865
 356/4.01

OTHER PUBLICATIONS

Rodenbeck C.T., et al., "Delta Modulation Technique for Improving the Sensitivity of Monobit Subsamplers in Radar and Coherent Receiver Applications," IEEE Transactions on Microwave Theory and Techniques, Aug. 2014, vol. 62 (8), pp. 1811-1822.
International Search Report and Written Opinion—PCT/US2017/045657—ISA/EPO—Oct. 23, 2017.

* cited by examiner

DIFFERENTIATING-INTEGRATING SAMPLING DATA RECEIVER

FIELD

The present disclosure relates generally to electronics, and more specifically to transmitters and receivers.

BACKGROUND

Communication systems are known in which a single wire carries clock, data, and power in the form of a combined signal. The transmitter may superimpose power on the clock and data signal using a passive inductor-capacitor (LC) circuit. In a conventional receiver of such a communication system, the signal is filtered and sampled, and each sample is compared with a reference value. Depending on whether the result indicates that the sample exceeds or does not exceed the reference value, the receiver outputs a "1" or a "0" as the detected bit value. At least two effects can hamper the receiver's ability to correctly detect the data: droop and ringing.

At the receiver end of the wire, the combined signal may experience an amplitude decrease between bit transitions due to the effect of the LC circuit. Such an amplitude decrease may be referred to as "droop." The longer the time interval between two successive bit transitions, the greater the droop may be.

At the receiver end of the wire, the combined signal may experience ringing due to changes in current drawn by the receiver. Other features of the receiver may also cause other types of interference that can similarly hamper the receiver's ability to correctly detect and decode the data.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a serial data receiver, which may include an edge detector and a digital integrator. The edge detector may be configured to provide an edge detection indication comprising one or more edge detection signals in response to a comparison between two successive samples of a receiver input signal. The edge detection indication represents a detected negative edge, a detected positive edge, or no detected edge. The digital integrator may be configured to provide a receiver output signal in response to integration of the one or more edge detection signals.

Another aspect of the disclosure provides a method for receiving serial data, which may include: providing an edge detection indication comprising one or more edge detection signals in response to a comparison between two successive samples of a receiver input signal, the edge detection indication representing one of a detected negative edge, a detected positive edge, and no detected edge, and integrating the one or more edge detection signals to provide a receiver output signal.

Another aspect of the disclosure provides an apparatus, which may include means for providing an edge detection indication comprising one or more edge detection signals in response to a comparison between two successive samples of a receiver input signal, the edge detection indication representing one of a detected negative edge, a detected positive edge, and no detected edge, and means for integrating the one or more edge detection signals to provide a receiver output signal.

Another aspect of the disclosure provides a serial data receiver, which may include first through fourth sampling comparison circuits, first and second multiplexers, and a digital integrator. The first sampling comparison circuit is configured to sample a receiver input signal during even cycles of a sample clock signal. The second sampling comparison circuit is configured to sample a receiver input signal during odd cycles of the sample clock signal. The first multiplexer is configured to select one of an output of the first sampling comparison circuit and an output of the second sampling comparison circuit. The third sampling comparison circuit is configured to sample a receiver input signal during even cycles of the sample clock signal. The fourth sampling comparison circuit is configured to sample a receiver input signal during odd cycles of the sample clock signal. The second multiplexer is configured to select one of an output of the third sampling comparison circuit and an output of the fourth sampling comparison circuit. The digital integrator is coupled to outputs of the first multiplexer and the second multiplexer.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

Figure 1:
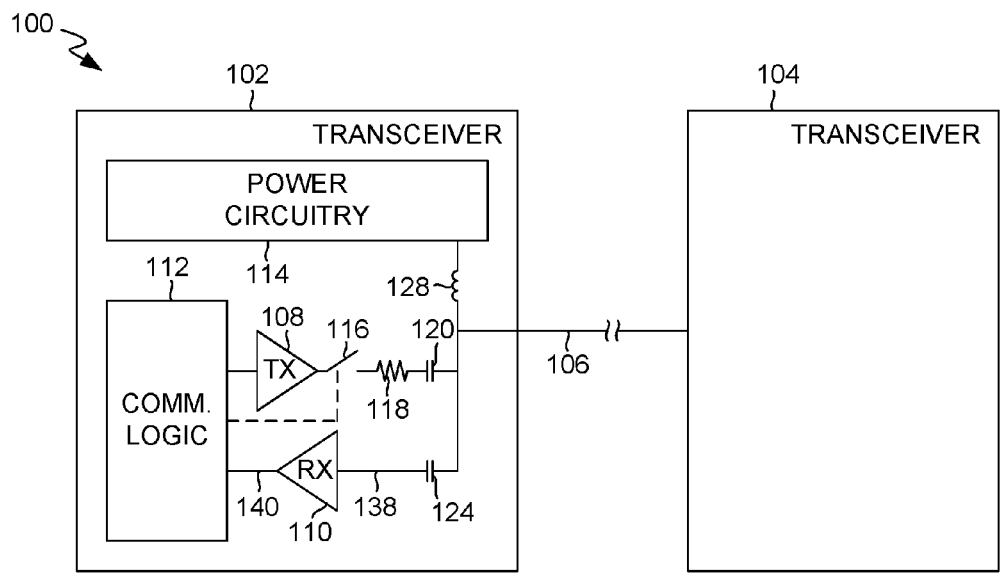
FIG. 1 is a block diagram of a serial data communication system having a receiver, in accordance with an exemplary embodiment.

FIG. 1 illustrates an exemplary bidirectional data communication system 100 comprising a first transceiver 102 and a second transceiver 104 connected to each other through a data communication line 106. The system 100 may comprise a bidirectional serial data communication system, and the line 106 may comprise a serial data communication line. Embodiments below are described with respect to a bidirectional serial data communication system, but those of skill in the art will understand that the concepts herein are not limited to such systems. In some systems, for example, a parallel or wireless interface is implemented.

First transceiver 102 includes a serial data transmitter 108, a serial data receiver 110, digital communication logic 112, and power circuitry 114. Digital communication logic 112 serves as a source of data to be transmitted and as a destination for data that is received. Digital communication logic 112 controls a switch 116 at the output of transmitter 108 to time-multiplex data transmission with data reception. When switch 116 is closed, transmitter 108 can transmit data to second transceiver 104. When switch 116 is open, receiver 110 can receive data from second transceiver 104. The output of transmitter 108 is coupled to serial data communication line 106 from switch 116 through a resistor 118 and a capacitor 120. Although in the exemplary embodiment shown in FIG. 1 such transmitter coupling occurs through resistor 118 and capacitor 120, in other embodiments (not shown), such coupling may occur through other circuitry. Serial data communication line 106 is coupled to the input of receiver 110 through a capacitor 124. Although in the exemplary embodiment shown in FIG. 1 such coupling occurs capacitor 124, in other embodiments (not shown), such coupling may occur through other circuitry. Power provided by power circuitry 114 is superimposed onto serial data communication line 106 through an inductor 128. In other embodiments (not shown), power may be superimposed onto such a data line in other ways. Thus, second transceiver 104 can be powered from serial data communication line 106. For example, first transceiver 102 can be a master device, and second transceiver 104 can be a slave device configured to operate together in accordance with a master-slave communication protocol. For example, first transceiver 102 can be included within a portable electronic device, such as a smartphone, while second transceiver 104 can be included within noise-canceling headphones or other accessory connected to the portable electronic device. In some such embodiments, the transceiver 102 is implemented with a headphone jack configured to couple to the line 106. In certain aspects, the line 106 is coupled to a microphone sleeve of an audio adaptor configured for insertion into the headphone jack. Second transceiver 104 may be configured to transmit and receive data in a manner similar to that described above with regard to first transceiver 102. Accordingly, for purposes of brevity second transceiver 104 is not described in similar detail herein. In some embodiments, the transceiver 104 may omit the power circuitry 114. In other embodiments—for example, in certain aspects when the transceiver 102 is configured as a master and the transceiver 104 is configured as a slave—the transceiver 104 includes circuitry that is configured to salvage power transmitted from the transceiver 102. In some embodiments, the transceiver 104 further includes circuitry configured to salvage a clock from the signals transmitted by the transceiver 102.

The combined effect of inductor 128 and capacitor 124 (or other inductances and capacitances elsewhere in the circuitry, such as within second transceiver 104) can promote amplitude droop between bit transitions in the signal at the input of receiver 110. For reasons described below, receiver 110 may be less hampered by amplitude droop, ringing, and other low-frequency effects than conventional serial data receivers. The operations described herein are explained with respect to the elements illustrated within transceiver 102. Those of skill in the art, however, will understand that such operations may similarly be conducted on elements implemented within the transceiver 104.

Figure 2:
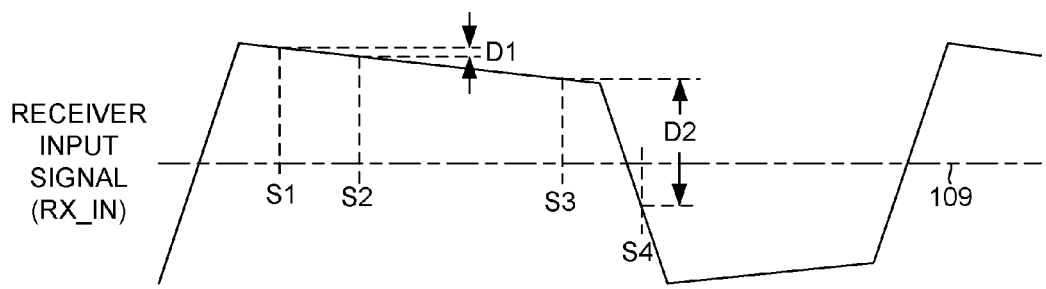
FIG. 2 is a waveform diagram, showing an example of sampling and differentiating a receiver input signal.

FIG. 2 illustrates in generalized form an example of amplitude droop between bit transitions in the receiver input signal 138 (RX_IN) at the input of receiver 110. The receiver input signal is sampled at a periodic interval that is equal to or less than the unit interval at which bit transitions or edges can occur, such as every X nanoseconds. As illustrated in FIG. 2, when no bit transition occurs in the receiver input signal between successive sampling times S1 and S2, the difference D1 between amplitudes sampled at S1 and S2 may be due primarily to amplitude droop and may therefore be small. However, when a bit transition occurs, the difference D2 between amplitudes sampled at two other successive sampling times S3 and S4 is larger. Large differences in amplitude are more readily detectable than small differences. Receiver 110 exploits this property by employing analog differentiation of receiver input signal 138 and digital integration of the signal differences (e.g., integration of derivatives) to, in effect, compare the amplitude of a current sample (e.g., at S2 in FIG. 2) with the amplitude of a previous sample (e.g., at S1 in FIG. 2). Receiver 110 thus avoids the potential problems of conventional comparison methods that rely on comparing each sample with a fixed threshold or reference value, such as the average signal level represented in FIG. 2 by the horizontal axis 109. It should be understood that FIG. 2 is not to scale, and the receiver input signal may be sampled at many more times than the few exemplary sampling times S1-S4. Note that the average signal level of receiver input signal 138 may represent the power transmitted on line 106 (FIG. 1). As one example, the power may be 2.85 volts (V). Also, in this example, receiver input signal 138 may fluctuate with changes in the transmitted data bits between a maximum of 200 mV above the average signal level and a minimum of −200 mV below the average signal level. Conventional methods that compare samples with the average signal level may falsely interpret amplitude droop as bit transitions, for example as the signal level of repetitive transmitted bits nears the average signal level.

The receiver input signal 138 (RX_IN) may be sampled at a periodic interval that is equal to or less than the unit interval, as described above. However, in other embodiments (not shown) such a receiver input signal may be over-sampled to generate more accurate timing information to improve receiver sensitivity.

Figure 3:
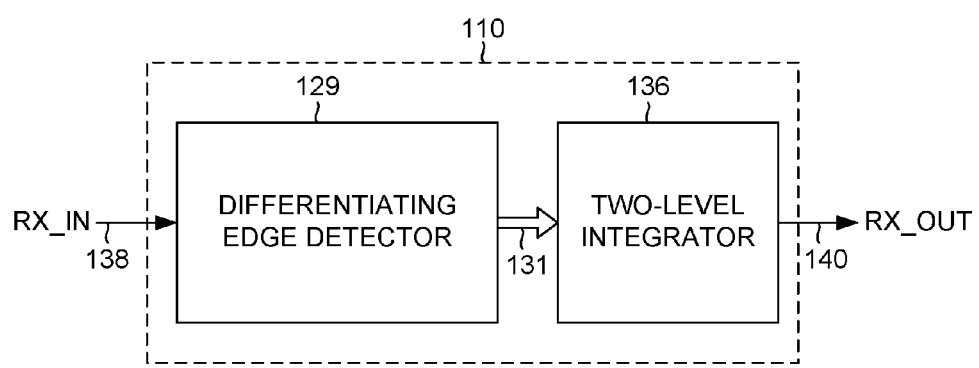
FIG. 3 is a block diagram of the receiver of FIG. 1, in accordance with an exemplary embodiment including an edge detector.

FIG. 3 is a block diagram of receiver 110, in accordance with an exemplary embodiment. In the exemplary embodiment shown in FIG. 3, receiver 110 may include a differentiating edge detector 129 and a two-level digital integrator 136. Differentiating edge detector 129 may be configured to provide an edge detection indication 131 comprising one or more edge detection signals in response to a comparison between two successive samples of receiver input signal 138. In the exemplary embodiment shown in FIG. 3, edge detection indication 131 can assume one of three logical states: a first logical state representing a detected negative edge, a second logical state representing a detected positive edge, and a third logical state representing no detected edge. Two-level digital integrator 136 may be configured to provide a receiver output signal 140 (RX_OUT) in response to integration of edge detection indication 131. Receiver output signal 140 represents the effect of receiver 110 to reconstruct the information contained in receiver input signal 138. In other words, two-level digital integrator 136 is configured to reconstruct receiver input signal 138 based on the output of differentiating edge detector 129. In some embodiments, the edge detection indication 131 may indicate that no input or samples were detected, which may be considered and/or interpreted as the third logical state, or which may be handled distinctly by the integrator 136, for example by ceasing or pausing the output signal 140 or returning the signal to an average or default value.

Figure 4:
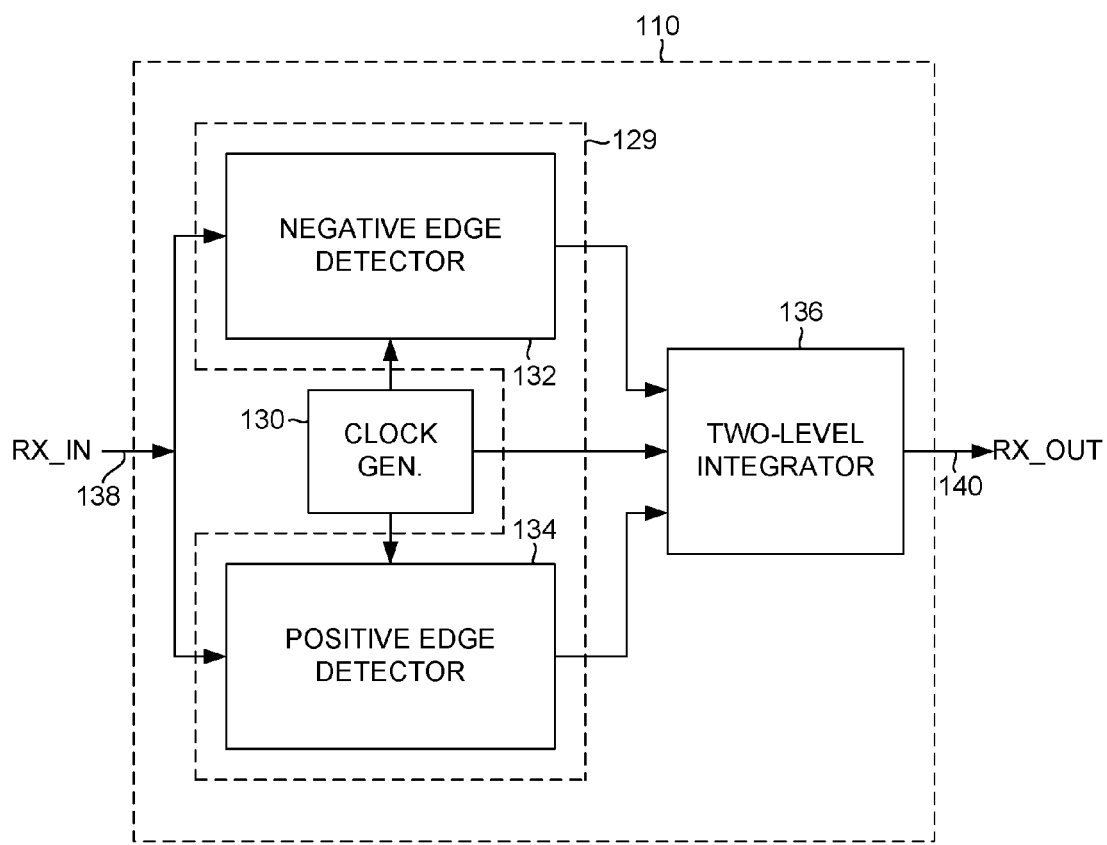
FIG. 4 is similar to FIG. 3, showing an embodiment of the exemplary edge detector of the receiver in further detail.

FIG. 4 illustrates that differentiating edge detector 129 may include a differentiating negative edge detector 132, a differentiating positive edge detector 134, and the two-level digital integrator 136. As described below, differentiating negative edge detector 132 may be configured to output a signal representing detected negative edges of the receiver input signal 138, and differentiating positive edge detector 134 may be configured to output a signal representing detected positive edges of the receiver input signal 138. Two-level digital integrator 136 may be configured to provide a receiver output signal 140 in response to the outputs of differentiating negative edge detector 132 and differentiating positive edge detector 134. In other words, two-level digital integrator 136 is configured to reconstruct receiver input signal 138 based on the output of differentiating negative edge detector 132, the output of differentiating positive edge detector 134, and one or more clock signals. A clock signal generator circuit 130 may generate and provide clock signals described below to differentiating negative edge detector 132, differentiating positive edge detector 134, and two-level digital integrator 136.

Figure 5:
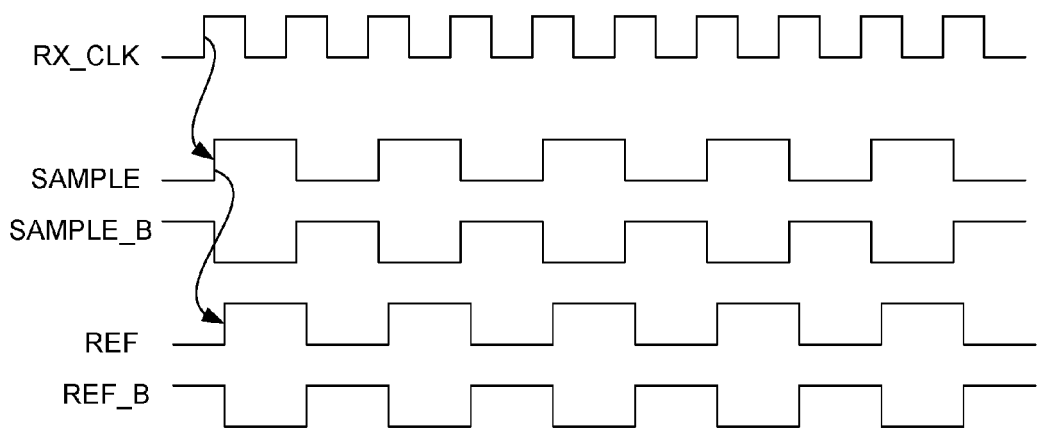
FIG. 5 is a waveform diagram of receiver clock and reference signals, in accordance with an exemplary embodiment.

FIG. 5 illustrates clock signals used in receiver 110, including a receiver system clock signal (RX_CLK), a sample clock signal (SAMPLE), and a reference clock signal (REF). In the illustrated embodiment, the sample clock signal (SAMPLE) and the reference clock signal (REF) each have one-half the frequency of the receiver system clock signal (RX_CLK). In other embodiments, the receiver system clock signal (RX_CLK), the sample clock signal (SAMPLE), and the reference clock signal (REF) have approximately the same frequency. The complement of the sample clock signal (SAMPLE_B) and the complement of the reference clock signal (REF_B) are also provided. Note that each rising or positive edge and each falling or negative edge of the sample clock signal (SAMPLE) occurs in response to a positive edge of the receiver system clock signal (RX_CLK), as indicated in FIG. 5 by the arrow pointing from an exemplary edge of the receiver system clock signal (RX_CLK) to an exemplary edge of the sample clock signal (SAMPLE). The slight time difference between a rising edge of the receiver system clock signal (RX_CLK) and the immediately following rising or falling edge of the sample clock signal (SAMPLE) may represent a gate delay (e.g., as a result of triggering a flip-flop (not shown) with the receiver system clock signal) and any additional time delay that may be added by a other gate delays or a delay element (not shown). Each edge of the reference clock signal (REF) occurs in response to an edge of the sample clock signal (SAMPLE), as indicated in FIG. 5 by the arrow pointing from an exemplary edge of the sample clock signal (SAMPLE) to an exemplary edge of the reference clock signal (REF). The slight time difference between an edge of the sample clock signal (SAMPLE) and the immediately following edge of the reference clock signal (REF) may represent a gate delay (e.g., as a result of one or more logic gates to which the sample clock is input) and any additional time delay that may be added by a delay element (not shown). The effect of the foregoing is to provide at least a slight delay between the edges of the receiver clock signal (RX_CLK) and the corresponding edges of the sample clock signal (SAMPLE) and at least a slight delay between the edges of the sample clock signal (SAMPLE) and the corresponding edges of the reference clock signal (REF). The sample clock signals (SAMPLE and SAMPLE_B) have one-half the frequency of the receive clock signal (RX_CLK) because the sample clock signals drive two samplers, running out of phase with respect to each other, to effectively provide 4-phase sampling of receiver input signal 138, as described below with regard to FIG. 6. The 4-phase sampling of receiver input signal 138 may be referred to as "over-sampling" because samples occur at less than the unit interval of the data, i.e., the sampling frequency is greater than the data frequency. This over-sampling may be beneficial in some embodiments, but is not required in all embodiments. Also, in other embodiments (not shown), over-sampling may occur at a different rate than that described herein. Some or all of the receiver system clock signal (RX_CLK), the sample clock signal (SAMPLE), the complement of the sample clock signal (SAMPLE_B), the reference clock signal (REF), and the complement of the reference clock signal (REF_B), may be provided by clock signal generator circuit 130 (FIG. 4) of receiver 110 or other circuitry of first transceiver 102.

Figure 6:
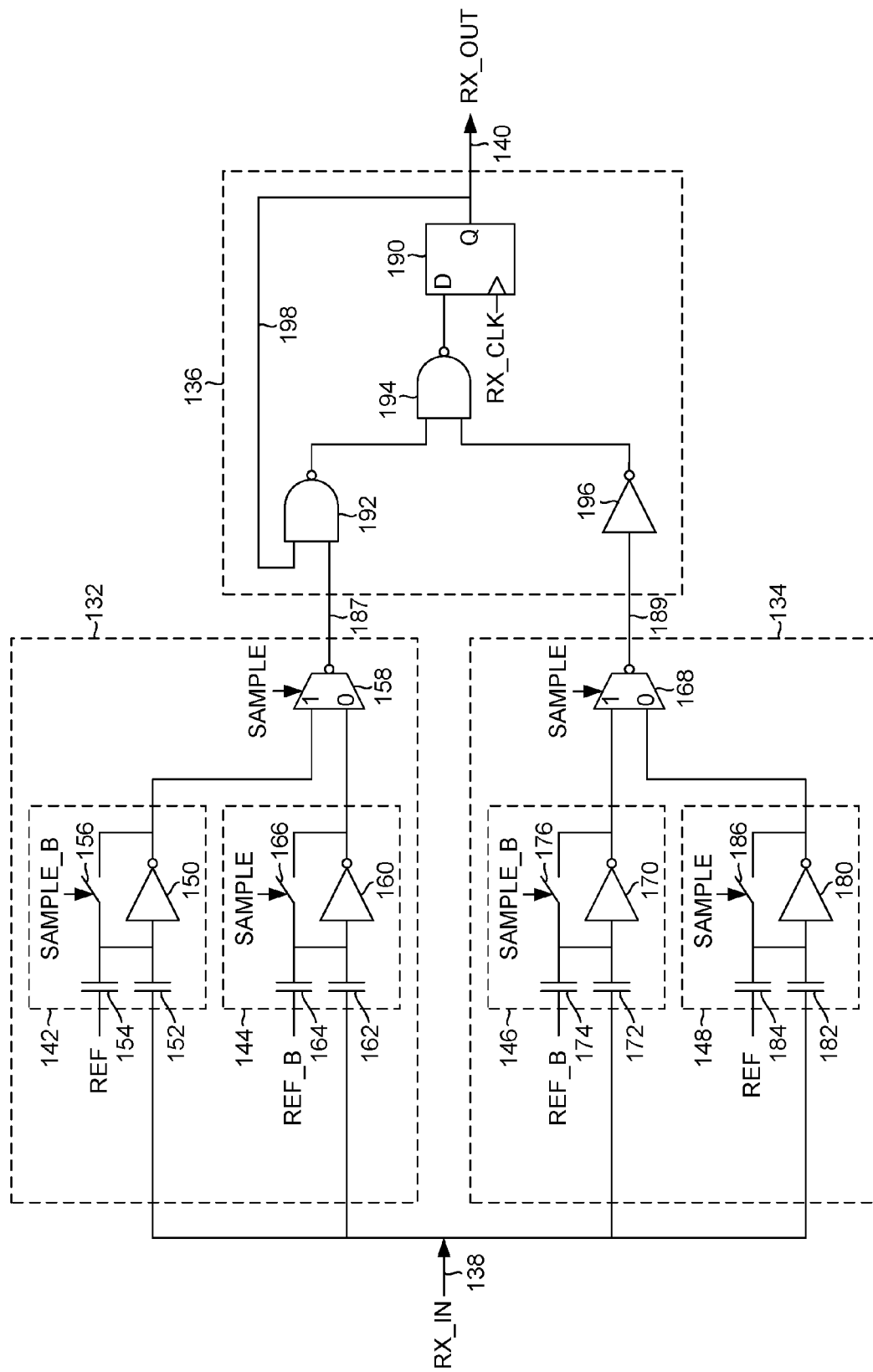
FIG. 6 is a circuit diagram of the receiver of FIG. 4, in accordance with an exemplary embodiment.

FIG. 6 illustrates an embodiment of portions of receiver 110 in further detail. Differentiating negative edge detector 132 may include a first sampling comparison circuit 142 and a second sampling comparison circuit 144. Similarly, differentiating positive edge detector 134 may include a third sampling comparison circuit 146 and a fourth sampling comparison circuit 148. First sampling comparison circuit 142 and second sampling comparison circuit 144 sample alternately with each other, while third sampling comparison circuit 146 and fourth sampling comparison circuit 148 likewise sample alternately with each other. Thus, for example, first sampling comparison circuit 142 and third sampling comparison circuit 146 may sample "even" bit intervals, while second sampling comparison circuit 144 and fourth sampling comparison circuit 148 may sample "odd" bit intervals. The operation of sampling comparison circuits 142-148 is described in further detail below with regard to the waveform diagrams of FIGS. 10-12.

In the embodiment of the differentiating negative edge detector 132 illustrated in FIG. 6, a first multiplexer 158 operates in response to the sample clock signal (SAMPLE) to select the output of first sampling comparison circuit 142 when the sample clock signal (SAMPLE) is in a high or "1"

state and to select the output of second sampling comparison circuit 144 when the sample clock signal (SAMPLE) is in a low or "0" state.

First sampling comparison circuit 142 includes a first inverting amplifier 150, a first input capacitor 152, a first reference capacitor 154, and a first switch 156. First switch 156 selectively couples the input of first inverting amplifier 150 to the output of first inverting amplifier 150, which defines the output of first sampling comparison circuit 142. First input capacitor 152 couples the receiver input signal 138 to an input of first inverting amplifier 150 and an input of first switch 156. First reference capacitor 154 couples the reference clock signal (REF) to the input of first inverting amplifier 150 and the input of first switch 156. First switch 156 is operable by the complement of the sample clock signal (SAMPLE_B). In the illustrated embodiment, first switch 156 is closed in response to the complement of the sample clock signal (SAMPLE_B) being in a high or "1" state. Thus, first sampling comparison circuit 142 is configured to provide, during alternate (e.g., odd and even) cycles of the complement of the sample clock signal (SAMPLE_B), a sample of receiver input signal 138 alternating with a reference voltage corresponding to the level of the reference clock signal (REF). That is, when first switch 156 is in an open state, first inverting amplifier 150 serves as an amplifier to provide a sample of receiver input signal 138, and when first switch 156 is in a closed state, first inverting amplifier 150 serves to provide the reference voltage.

Second sampling comparison circuit 144 includes a second inverting amplifier 160, a second input capacitor 162, a second reference capacitor 164, and a second switch 166. Second switch 166 selectively couples the input of second inverting amplifier 160 to the output of second inverting amplifier 160, which defines the output of second sampling comparison circuit 144. Second input capacitor 162 couples the receiver input signal 138 to an input of second inverting amplifier 160 and an input of second switch 166. Second reference capacitor 164 couples the reference clock signal (REF) to the input of second inverting amplifier 160 and the input of first switch 156. Second switch 166 is operable by the sample clock signal (SAMPLE). That is, second switch 166 is closed in response to the sample clock signal (SAMPLE) being in a high or "1" state. Thus, second sampling comparison circuit 144 is configured to provide, during alternate cycles of the sample clock signal (SAMPLE), a sample of receiver input signal 138 alternating with a reference voltage corresponding to the level of the reference clock signal (REF). In the illustrated embodiment, when second switch 166 is in an open state, second inverting amplifier 160 serves as an amplifier to provide a sample of receiver input signal 138, and when second switch 166 is in a closed state, second inverting amplifier 160 serves to provide the reference voltage.

In the embodiment of the differentiating negative edge detector 134 illustrated in FIG. 6, a second multiplexer 168 operates in response to the sample clock signal (SAMPLE) to select the output of third sampling comparison circuit 146 when the sample clock signal (SAMPLE) is in a high or "1" state and to select the output of fourth sampling comparison circuit 148 when the sample clock signal (SAMPLE) is in a low or "0" state.

Third sampling comparison circuit 146 includes a third inverting amplifier 170, a third input capacitor 172, a third reference capacitor 174, and a third switch 176. Third switch 176 selectively couples the input of third inverting amplifier 170 to the output of third inverting amplifier 170, which defines the output of third sampling comparison circuit 146. Third input capacitor 172 couples the receiver input signal 138 to an input of third inverting amplifier 170 and an input of third switch 176. Third reference capacitor 174 couples the reference clock signal (REF) to the input of third inverting amplifier 170 and the input of third switch 176. Third switch 176 is operable by the complement of the sample clock signal (SAMPLE_B). That is, third switch 176 is closed in response to the complement of the sample clock signal (SAMPLE_B) being in a high or "1" state. Thus, third sampling comparison circuit 146 is configured to provide, during alternate cycles of the complement of the sample clock signal (SAMPLE_B), a sample of receiver input signal 138 alternating with a reference voltage corresponding to the level of the reference clock signal (REF). That is, when third switch 176 is in an open state, third inverting amplifier 170 serves as an amplifier to provide a sample of receiver input signal 138, and when third switch 176 is in a closed state, third inverting amplifier 170 serves to provide the reference voltage.

Fourth sampling comparison circuit 148 includes a fourth inverting amplifier 180, a fourth input capacitor 182, a fourth reference capacitor 184, and a fourth switch 186. Fourth switch 186 selectively couples the input of fourth inverting amplifier 180 to the output of fourth inverting amplifier 180, which defines the output of fourth sampling comparison circuit 148. Fourth input capacitor 182 couples the receiver input signal 138 to an input of fourth inverting amplifier 180 and an input of fourth switch 186. Fourth reference capacitor 184 couples the reference clock signal (REF) to the input of fourth inverting amplifier 180 and the input of fourth switch 186. Fourth switch 186 is operable by the sample clock signal (SAMPLE). That is, fourth switch 186 is closed in response to the sample clock signal (SAMPLE) being in a high or "1" state. Thus, fourth sampling comparison circuit 148 is configured to provide, during alternate cycles of the sample clock signal (SAMPLE), a sample of receiver input signal 138 alternating with a reference voltage corresponding to the level of the reference clock signal (REF). That is, when fourth switch 186 is in an open state, fourth inverting amplifier 180 serves as an amplifier to provide a sample of receiver input signal 138, and when fourth switch 186 is in a closed state, fourth inverting amplifier 180 serves to provide the reference voltage.

The input of two-level digital integrator 136 is coupled to the output of differentiating negative edge detector 132 and the output of differentiating positive edge detector 134 to receive a negative edge detection signal 187 and a positive edge detection signal 189, respectively. In the embodiment of the two-level digital integrator 136 illustrated in FIG. 6, the integrator 136 includes a D-type flip-flop 190 and combinational logic comprising a first (two-input) NAND gate 192, a second (two-input) NAND gate 194, and an inverter 196. Receiver output signal 140 is provided at the output (Q) of flip-flop 190. The clock input of flip-flop 190 receives the receiver system clock signal (RX_CLK). The first input of first NAND gate 192 is coupled to the output of differentiating negative edge detector 132. The second input of first NAND gate 192 is coupled to the output (Q) of flip-flop 190. Thus, receiver output signal 140 is provided to first NAND gate 192 through a feedback path 198. The first input of second NAND gate 194 is coupled to the output of first NAND gate 192. The second input of second NAND gate 194 is coupled to the output of inverter 196. The input of inverter 196 is coupled to the output of differentiating positive edge detector 134.

Differentiating edge detector 129 or its constituent negative edge detector 132 and positive edge detector 134 may be implemented in any suitable circuitry, such as, for example, in one or more analog chips or analog portions of one or more chips. Two-level digital integrator 136 may be implemented in any suitable circuitry, such as, for example, in a digital chip or digital portion of a chip, which may be, though is not necessarily, the same chip as that in which differentiating edge detector 129 is implemented. In some embodiments, the edge detector 129 is physically and/or functionally separated from the integrator 136 and coupled thereto, for example by an interface such as a digital interface.

Figure 7:
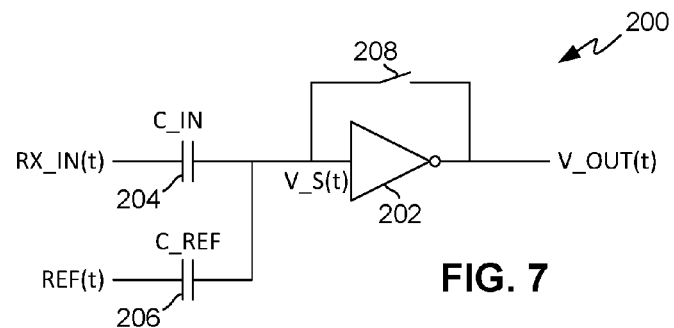
FIG. 7 is a circuit diagram illustrating a portion of the circuitry of FIG. 6.
Figure 8:
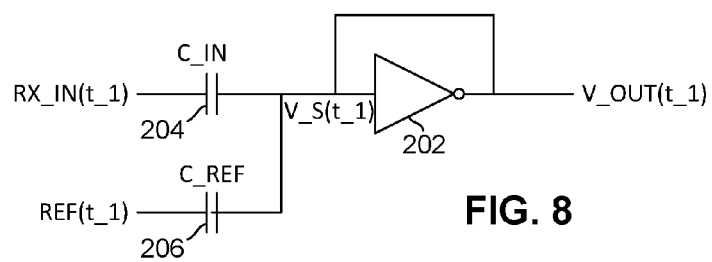
FIG. 8 is a circuit diagram illustrating the circuitry portion of FIG. 7 in a first operational state.
Figure 9:
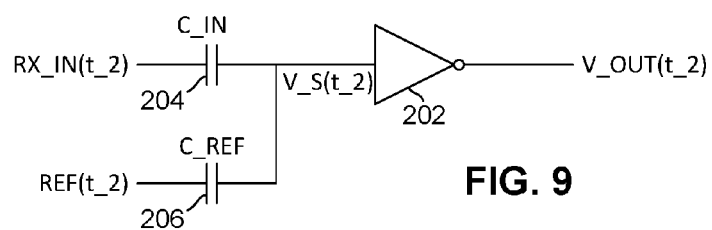
FIG. 9 is a circuit diagram illustrating the circuitry portion of FIG. 7 in a second operational state.
Figure 10:
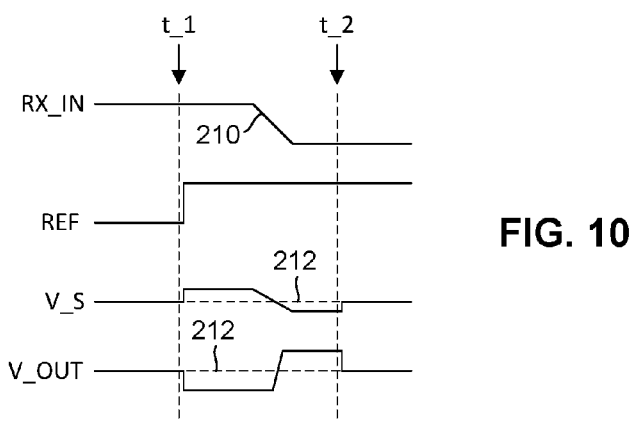
FIG. 10 is a waveform diagram illustrating an exemplary instance of operation of the circuitry portion of FIG. 7.

FIGS. 7-10 illustrate the operation of sampling comparison circuits 142-148 pursuant to the embodiments described above. As illustrated in FIG. 7, an exemplary sampling comparison circuit 200, which represents one of sampling comparison circuits 142, 144, 146, and 148, includes an exemplary inverting amplifier 202, an exemplary input capacitor 204, an exemplary reference capacitor 206, and an exemplary switch 208. The signal V_S represents the voltage at the input of exemplary inverting amplifier 202 (and thus the signal V_S(t) represents the voltage at the input of exemplary inverting amplifier 202 at a time "t"). The signal V_OUT represents the voltage at the output of exemplary inverting amplifier 202 (and thus the signal V_OUT(t) represents the voltage at the output of exemplary inverting amplifier 202 at a time "t"). With reference to FIG. 10, in an exemplary instance, a falling or negative edge 210 occurs in receiver input signal 138 (RX_IN) at a time between a first time "t_1" and a second time "t_2". First time "t_1" and second time "t_2" may occur on successive edges of the above-described sample clock (not shown in FIG. 10). For purposes of this example, exemplary sampling comparison circuit 200 may represent first sampling comparison circuit 142 or second sampling comparison circuit 144, which are configured to detect negative edges. As shown in FIG. 8, at time "t_1" exemplary switch 208 (which is controlled by the sample clock as described above) is in a closed state, thus coupling the input of exemplary inverting amplifier 202 to the output of exemplary inverting amplifier 202. Coupling the input of exemplary inverting amplifier 202 to the output of exemplary inverting amplifier 202 gives rise to a threshold voltage 212 (FIG. 10) that determines whether exemplary inverting amplifier 202 switches state. Following time "t_1" in this example, the reference clock signal (REF) transitions from low to high. When the input of exemplary inverting amplifier 202 is coupled to the output of exemplary inverting amplifier 202 (shown in a conceptual manner in FIG. 8 that represents exemplary switch 208 (FIG. 7) being in a closed state), a sampling function occurs because exemplary input capacitor 204 charges in response to the voltage of receiver input signal 138 (RX_IN), and exemplary reference capacitor 206 charges in response to the voltage of the reference clock signal (REF). As shown in FIG. 10, following time "t_1" the signal V_S increases in response to the reference clock signal and then decreases in response to negative edge 210. In response to the signal V_S decreasing below threshold voltage 212, the output of exemplary inverting amplifier 202 transitions from low to high, indicating detection of negative edge 210. Then, at time "t_2," when the input of exemplary inverting amplifier 202 is de-coupled from the output of exemplary inverting amplifier 202 (shown in a conceptual manner in FIG. 9 that represents exemplary switch 208 (FIG. 7) being in an open state), exemplary inverting amplifier 202 amplifies the signal V_S.

Differentiating negative edge detector 132 and differentiating positive edge detector 134 each has a "differentiation" or difference function because each determines the voltage difference between receiver input signal 138 (RX_IN) at two successive (sampling) times. In response to determining that the current sample voltage is equal to the preceding sample voltage, first sampling comparison circuit 142 outputs a "0" and second sampling comparison circuit 144 also outputs a "0". In response to determining that the current sample voltage is greater than the preceding sample voltage, first sampling comparison circuit 142 outputs a "1" and second sampling comparison circuit 144 outputs a "0". In response to determining that the current sample voltage is less than the preceding sample voltage, first sampling comparison circuit 142 outputs a "0" and second sampling comparison circuit 144 outputs a "1". Accordingly, in the embodiment described above with respect to FIG. 6, first multiplexer 158 outputs a "1" (negative edge detection signal 187) only when the current sample voltage is less than the previous sample voltage, which is indicative of a falling or negative edge.

In response to determining that the current sample voltage is equal to the preceding sample voltage, third sampling comparison circuit 146 outputs a "0" and fourth sampling comparison circuit 148 also outputs a "0". In response to determining that the current sample voltage is greater than the preceding sample voltage, third sampling comparison circuit 146 outputs a "1" and fourth sampling comparison circuit 148 outputs a "0". In response to determining that the current sample voltage is less than the preceding sample voltage, third sampling comparison circuit 146 outputs a "0" and fourth sampling comparison circuit 148 outputs a "1". Accordingly, in the embodiment described above with respect to FIG. 6, second multiplexer 168 outputs a "1" (positive edge detection signal 189) only when the current sample voltage is greater than the previous sample voltage, which is indicative of a rising or positive edge.

Negative edge detection signal 187 and positive edge detection signal 189, which are indicative of negative and positive edges, respectively, in the receiver input signal (RX_IN), are provided to two-level integrator 136. Two-level integrator 136 integrates negative edge detection signal 187 and positive edge detection signal 189 to produce the receiver output signal (RX_OUT) representing a detected bit.

Figure 11:
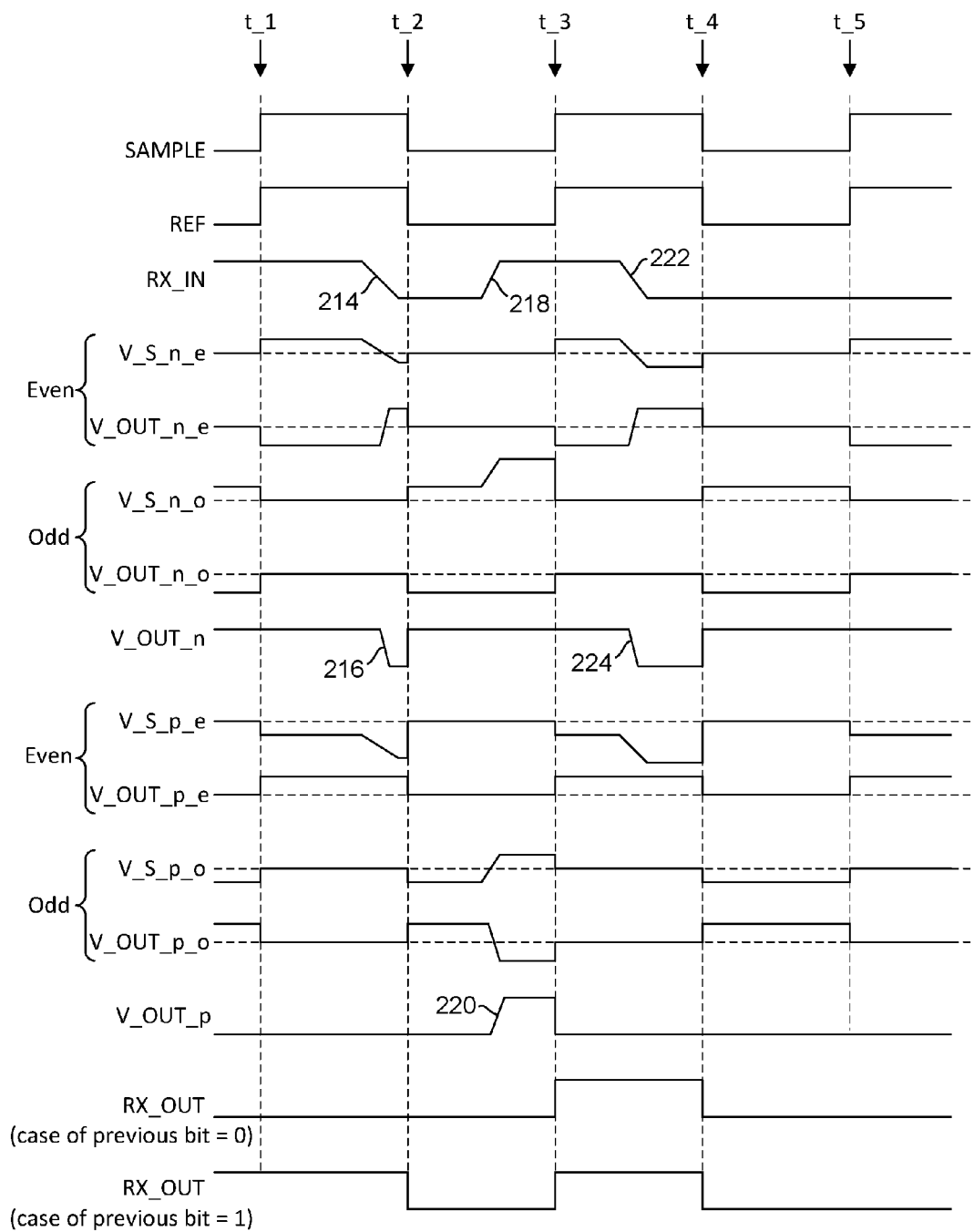
FIG. 11 is a waveform diagram illustrating an exemplary instance of operation of the receiver of FIG. 6.

FIG. 11 illustrates another example of operation of receiver 110. In FIG. 11: the signals V_S_n_e and V_OUT_n_e represent the voltages at the input and output, respectively, of first inverting amplifier 150, which is involved in the manner described above in detecting negative edges during even bit intervals; the signals V_S_n_o and V_OUT_n_o represent the voltages at the input and output, respectively, of second inverting amplifier 160, which is involved in the manner described above in detecting negative edges during odd bit intervals; the signals V_S_p_e and V_OUT_p_e represent the voltages at the input and output, respectively, of third inverting amplifier 170, which is involved in the manner described above in detecting positive edges during even bit intervals; and the signals V_S_p_o and V_OUT_p_o represent the voltages at the input and output, respectively, of fourth inverting amplifier 180, which is involved in the manner described above in detecting positive edges during odd bit intervals. The signal V_OUT_n_represents the voltage at the output of differentiating negative edge detector 132 (negative edge detection signal 187). The signal V_OUT_p represents the voltage at the output of differentiating positive edge detector 134

(positive edge detection signal 189). From FIGS. 6 and 11, it can be appreciated that in this example first sampling comparison circuit 142 and third sampling comparison circuit 146 simultaneously or substantially concurrently sample receiver input signal 138 (RX_IN) at successive times "t1" and "t2" and determine the voltage difference between RX_IN at time "t2" and RX_IN at time "t1" (i.e., an "even" bit interval), as well as simultaneously or substantially concurrently sample receiver input signal 138 at successive times "t3" and "t4" and determine the voltage difference between RX_IN at time "t4" and RX_IN at time "t3" (i.e., another "even" bit interval). Similarly, it can be appreciated that in this example second sampling comparison circuit 144 and fourth sampling comparison circuit 148 simultaneously or substantially concurrently sample receiver input signal 138 at successive times "t2" and "t3" and determine the voltage difference between RX_IN at time "t3" and RX_IN at time "t2" (i.e., an "odd" bit interval), as well as simultaneously or substantially concurrently sample receiver input signal 138 at successive times "t4" and "t5" and determine the voltage difference between RX_IN at time "t5" and RX_IN at time "t4" (i.e., another "odd" bit interval).

In the example shown in FIG. 11, a negative edge 214 that occurs in the receiver input signal (RX_IN) is detected as indicated by the transition 216 in the signal V_OUT_n (negative edge detection signal 187). Similarly, a positive edge 218 that occurs in the receiver input signal (RX_IN) is detected as indicated by the transition 220 in the signal V_OUT_p (positive edge detection signal 189). Likewise, another negative edge 222 that occurs in the receiver input signal (RX_IN) is detected as indicated by the transition 224 in the signal V_OUT_n.

Note that the receiver output signal (RX_OUT) at any time "t" (i.e., the currently detected bit) depends not only on the outputs of negative edge detector 132 and positive edge detector 134 at that time but also on the state of the most recently detected (i.e., previously detected) bit. Referring again to FIG. 6, in response to each cycle of the receiver system clock signal (RX_CLK), two-level integrator 136 produces the receiver output signal (RX_OUT) representing a detected bit. Feedback path 198 (FIG. 6) is employed to feed back the state of that most recently detected bit. In an instance in which the output of two-level integrator 136 is a "1" while the outputs of differentiating negative edge detector 132 and differentiating positive edge detector 134 represent a detected positive edge, feedback path 198 causes the output of two-level integrator 136 to remain at a "1". Similarly, in an instance in which the output of two-level integrator 136 is a "0" while the outputs of differentiating negative edge detector 132 and differentiating positive edge detector 134 represent a detected negative edge, feedback path 198 causes the output of two-level integrator 136 to remain at a "0". However, in an instance in which the output of two-level integrator 136 is a "0" while the outputs of differentiating negative edge detector 132 and differentiating positive edge detector 134 represent a detected positive edge, feedback path 198 causes the output of two-level integrator 136 to change to a "1". Similarly, in an instance in which the output of two-level integrator 136 is a "1" while the outputs of differentiating negative edge detector 132 and differentiating positive edge detector 134 represent a detected negative edge, feedback path 198 causes the output of two-level integrator 136 to change to a "0". In an instance in which the outputs of differentiating negative edge detector 132 and differentiating positive edge detector 134 represent that no edge has been detected, the output of two-level integrator 136 will remain the same. For the sake of brevity, FIG. 11 does not show detection of the previous bit but rather only the current bit. Therefore, two cases of the receiver output signal (RX_OUT) are shown in FIG. 11: the case in which the previously detected bit was a "0", and the case in which the previously detected bit was a "1". Also note that for purposes of clarity, certain slight signal delays, such as those described above with regard to FIG. 5, are not shown in FIG. 11.

Figure 12:
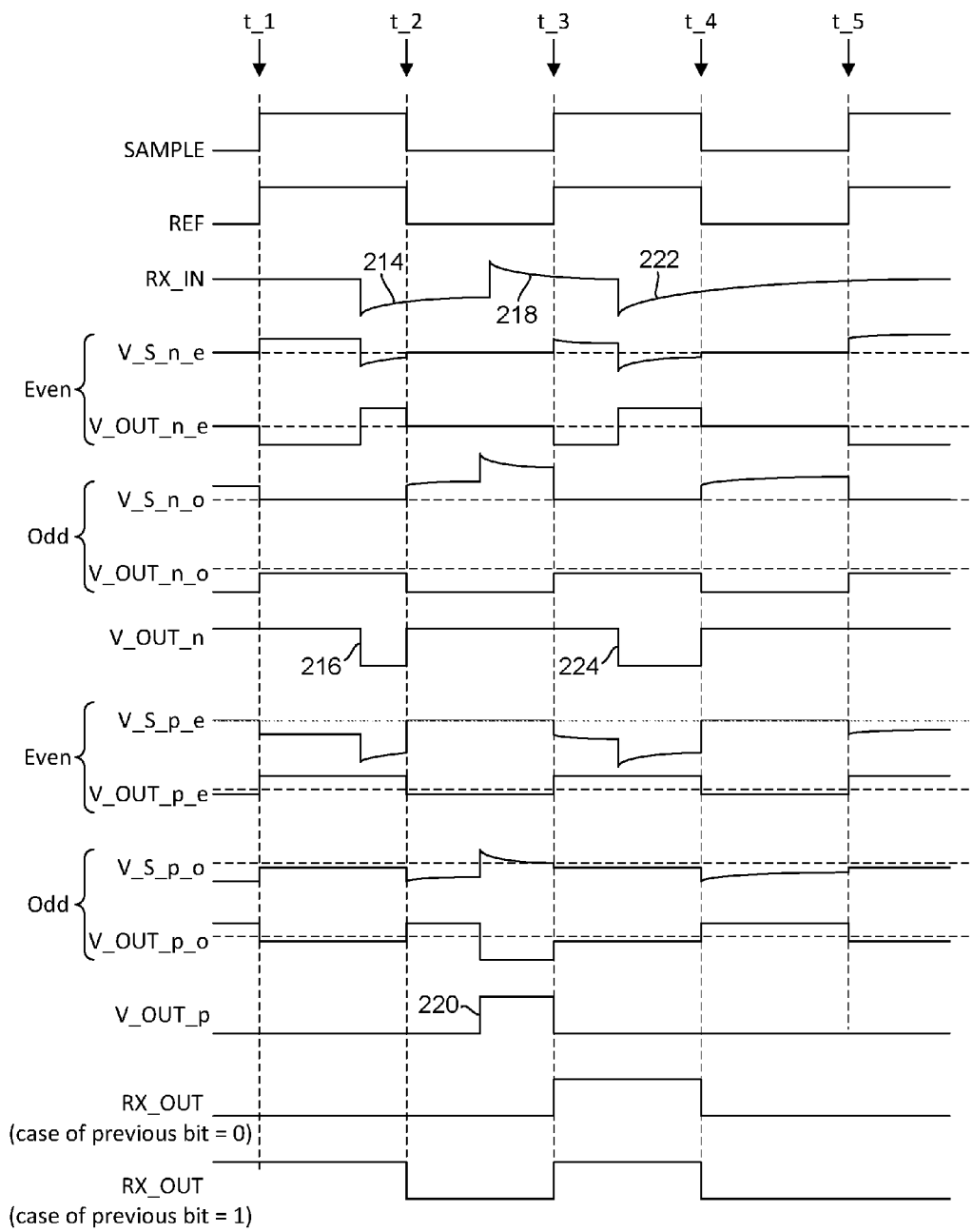
FIG. 12 is similar to FIG. 11, but including signal decay.

FIG. 12 is similar to FIG. 11, but shows that even with droop or decay that occurs in the receiver input signal (RX_IN), receiver 110 operates in the same manner described above. Note that negative edge 214 is characterized by a sharp decrease in amplitude followed by a positive droop or decay, while positive edge 218 is characterized by a sharp increase in amplitude followed by a negative droop or decay, and negative edge 222 is characterized by a sharp decrease in amplitude followed by a positive droop or decay.

Figure 13:
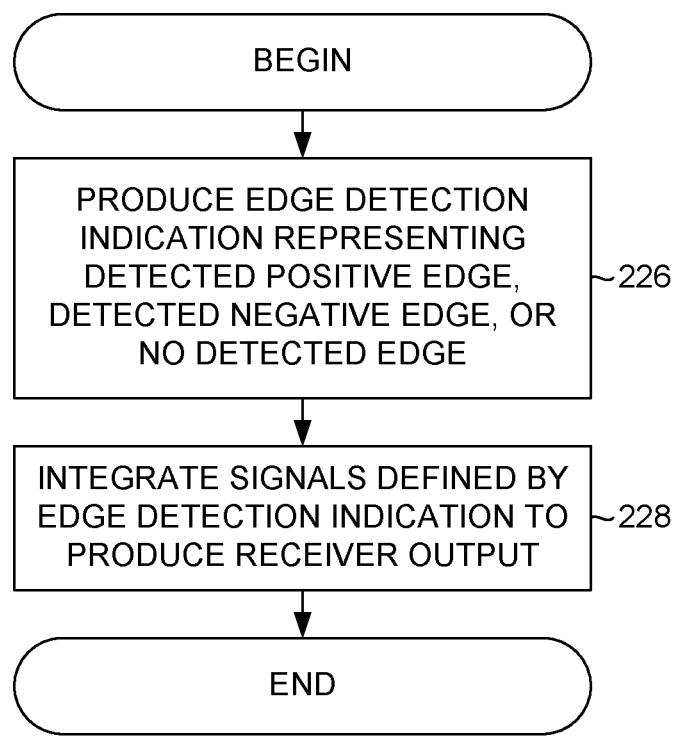
FIG. 13 is a flow diagram, illustrating a method of operation of the receiver of FIG. 2, in accordance with an exemplary embodiment.

FIG. 13 is a flow diagram summarizing the operation of receiver 110 in the exemplary embodiment. As indicated by block 226, differentiating edge detector 129 (FIG. 3) provides an edge detection indication 131 (comprising negative edge detection signal 187 and positive edge detection signal 189 in FIG. 6, or a signal indicating no edge was detected) in response to a comparison between two successive samples of the receiver input signal (RX_IN). As indicated by block 228, two-level integrator 136 integrates edge detection indication 131 to provide a receiver output signal.

Figure 14:
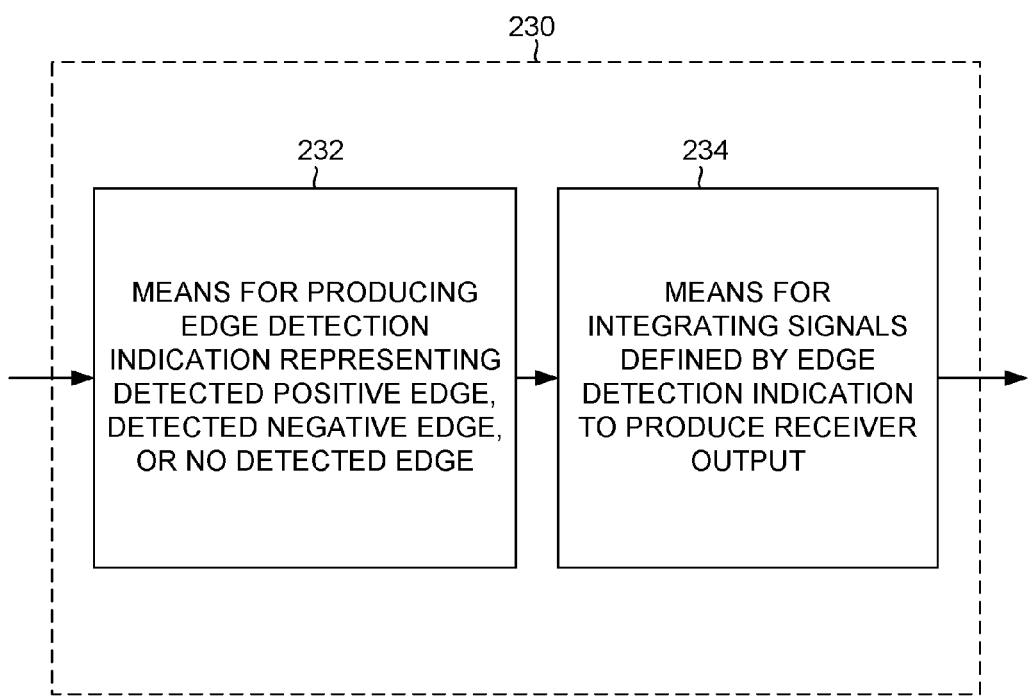
FIG. 14 is a functional block diagram of a receiver apparatus, in accordance with an exemplary embodiment.

FIG. 14 is a functional block diagram of a receiver apparatus 230. Apparatus 230 includes means 232 for providing an edge detection indication, and means 234 for integrating edge detection indication to provide a receiver output signal. Means 232 for providing an edge detection indication can be configured to perform the function described above with regard to block 226 of FIG. 13. Means 232 for providing an edge detection indication can comprise differentiating edge detector 129 or elements thereof, for example elements as described in FIGS. 4 and/or 6-9. Means 234 for integrating the edge detection indication to provide a receiver output signal can comprise two-level integrator 136 or elements thereof, for example elements as described in FIG. 4.

In accordance with the foregoing description, certain system and method embodiments described herein may promote accurate detection of data in a receiver input signal that may exhibit effects such as droop and ringing. For example, in systems in which power is delivered, the effect of droop caused by power delivery inductors may be reduced and/or low frequency interference may be filtered from power delivery. Further, offset from data comparison and flicker noise may be cancelled. In this way, power delivery system interfaces may be effectively attenuated and/or managed.

Therefore, although selected aspects have been illustrated and described in detail, it will be understood that various substitutions and alterations may be made therein without departing from the spirit and scope of the present invention, as defined by the following claims.

What is claimed is:

1. A serial data communications receiver, comprising:
   a differentiating negative edge detector configured to sample a receiver input signal and provide a negative edge detection signal representing detected negative edges of the receiver input signal, wherein the differentiating negative edge detector comprises a first sampling comparison circuit and a second sampling comparison circuit, the first sampling comparison circuit configured to alternately provide a sample of the receiver input signal and provide a reference voltage during alternate cycles of a complement of a sample clock signal, the second sampling comparison circuit configured to alternately provide a sample of the receiver input signal and provide the reference voltage during alternate cycles of the sample clock signal;

a differentiating positive edge detector configured to sample the receiver input signal and provide a positive edge detection signal representing detected positive edges of the receiver input signal, wherein the differentiating positive edge detector comprises a third sampling comparison circuit and a fourth sampling comparison circuit, the third sampling comparison circuit configured to alternately provide a sample of the receiver input signal and provide the reference voltage during alternate cycles of the complement of the sample clock signal, the fourth sampling comparison circuit configured to alternately provide a sample of the receiver input signal and provide the reference voltage during alternate cycles of the sample clock signal; and a digital integrator configured to provide a receiver output signal defining a digital reconstruction of the receiver input signal in response to integration of the negative edge detection signal and the positive edge detection signal.

2. The serial data communications receiver of claim 1, wherein the digital integrator has a feedback path.

3. The serial data communications receiver of claim 1, wherein:

the first sampling comparison circuit comprises a first inverting amplifier, a first reference capacitor, a first input capacitor, and a first switch operable in response to the complement of the sample clock signal, the first input capacitor coupling the receiver input signal to an input of the first inverting amplifier and an input of the first switch, the first reference capacitor coupling a reference clock signal to the input of the first inverting amplifier and the input of the first switch, an output of the first switch coupled to an output of the first inverting amplifier;

the second sampling comparison circuit comprises a second inverting amplifier, a second reference capacitor, a second input capacitor, and a second switch operable in response to the sample clock signal, the second input capacitor coupling the receiver input signal to an input of the second inverting amplifier and an input of the second switch, the second reference capacitor coupling the reference clock signal to the input of the second inverting amplifier and the input of the second switch, an output of the second switch coupled to an output of the second inverting amplifier;

the third sampling comparison circuit comprises a third inverting amplifier, a third reference capacitor, a third input capacitor, and a third switch operable in response to the complement of the sample clock signal, the third input capacitor coupling the receiver input signal to an input of the third inverting amplifier and an input of the third switch, the third reference capacitor coupling the reference clock signal to the input of the third inverting amplifier and the input of the third switch, an output of the third switch coupled to an output of the third inverting amplifier; and the fourth sampling comparison circuit comprises a fourth inverting amplifier, a fourth reference capacitor, a fourth input capacitor, and a fourth switch operable in response to the sample clock signal, the fourth input capacitor coupling the receiver input signal to an input of the fourth inverting amplifier and an input of the fourth switch, the fourth reference capacitor coupling the reference clock signal to the input of the fourth inverting amplifier and the input of the fourth switch, an output of the fourth switch coupled to an output of the fourth inverting amplifier.

4. The serial data communications receiver of claim 3, further comprising a clock signal generator circuit configured to provide the sample clock signal in response to a receiver system clock signal and to provide the reference clock signal in response to the sample clock signal, the sample clock signal and the reference clock signal each having a frequency one-half a frequency of the receiver system clock signal.

5. The serial data communications receiver of claim 1, wherein:

the differentiating negative edge detector further comprises a first multiplexer configured to select one of an output of the first sampling comparison circuit and an output of the second sampling comparison circuit in response to the sample clock signal, an output of the first multiplexer providing the negative edge detection signal; and the differentiating positive edge detector further comprises a second multiplexer configured to select one of an output of the third sampling comparison circuit and an output of the fourth sampling comparison circuit in response to the sample clock signal, an output of the second multiplexer providing the positive edge detection signal.

6. A method for receiving serial data communications, comprising:

sampling and differentiating a receiver input signal to provide a negative edge detection signal representing detected negative edges of the receiver input signal, wherein sampling and differentiating the receiver input signal to provide the negative edge detection signal comprises sampling the receiver input signal using a first sampling comparison circuit and a second sampling comparison circuit, the first sampling comparison circuit configured to alternately provide a sample of the receiver input signal and provide a reference voltage during alternate cycles of a complement of a sample clock signal, the second sampling comparison circuit configured to alternately provide a sample of the receiver input signal and provide the reference voltage during alternate cycles of the sample clock signal;

sampling and differentiating the receiver input signal to provide a positive edge detection signal representing detected positive edges of the receiver input signal, wherein sampling and differentiating the receiver input signal to provide the positive edge detection signal comprises sampling the receiver input signal using a third sampling comparison circuit and a fourth sampling comparison circuit, the third sampling comparison circuit configured to alternately provide a sample of the receiver input signal and provide the reference voltage during alternate cycles of the complement of the sample clock signal, the fourth sampling comparison circuit configured to alternately provide a sample of the receiver input signal and provide the reference voltage during alternate cycles of the sample clock signal; and integrating the negative edge detection signal and the positive edge detection signal to provide a receiver output signal defining a digital reconstruction of the receiver input signal.

7. The method of claim 6, wherein integrating comprises feeding back the receiver output signal.

8. The method of claim 6, further comprising:
selecting a first one of an output of the first sampling comparison circuit and an output of the second sampling comparison circuit in response to the sample clock signal and providing the first one as the negative edge detection signal; and
selecting a second one of an output of the third sampling comparison circuit and an output of the fourth sampling comparison circuit in response to the sample clock signal and providing the second one as the positive edge detection signal.

9. The method of claim 6, further comprising:
generating the sample clock signal in response to a receiver system clock signal; and
generating a reference clock signal in response to the sample clock signal, wherein the sample clock signal and the reference clock signal each have a frequency one-half a frequency of the receiver system clock signal, and wherein the reference clock signal is coupled to an input of at least one of the first sampling comparison circuit and the second sampling comparison circuit and to at least one of the third sampling comparison circuit and the fourth sampling comparison circuit.

10. A data communications apparatus, comprising:
means for sampling and differentiating a receiver input signal to provide a negative edge detection signal representing detected negative edges of a receiver input signal, wherein the means for sampling and differentiating the receiver input signal to provide a negative edge detection signal comprises a first sampling means for alternately providing a sample of the receiver input signal and providing a reference voltage during alternate cycles of a complement of a sample clock signal, and a second sampling means for alternately providing a sample of the receiver input signal and providing the reference voltage during alternate cycles of the sample clock signal;
means for sampling and differentiating the receiver input signal to provide a positive edge detection signal representing detected positive edges of the receiver input signal, wherein the means for sampling and differentiating the receiver input signal to provide a positive edge detection signal comprises a third sampling means for alternately providing a sample of the receiver input signal and providing the reference voltage during alternate cycles of the complement of the sample clock signal, and a fourth sampling means for alternately providing a sample of the receiver input signal and providing the reference voltage during alternate cycles of the sample clock signal; and
means for integrating the negative edge detection signal and positive edge detection signal to provide a receiver output signal defining a digital reconstruction of the receiver input signal.

11. The data communications apparatus of claim 10, wherein:
the means for sampling and differentiating the receiver input signal to provide a negative edge detection signal further comprises first means for multiplexing configured to select as one of an output of a first means for comparing samples and an output of a second means for comparing samples in response to a sample clock signal, an output of the first means for multiplexing providing the negative edge detection signal; and
the means for sampling and differentiating the receiver input signal to provide the positive edge detection signal further comprises a second means for multiplexing configured to select one of an output of a third means for comparing samples and an output of a fourth means for comparing samples in response to the sample clock signal, an output of the second means for multiplexing providing the positive edge detection signal.

12. A receiver, comprising:
a positive edge detector coupled to a source of an input signal, the positive edge detector configured to compare a current analog sample of the input signal to a previous analog sample of the input signal;
a negative edge detector coupled to the source of the input signal, the negative edge detector configured to compare a current analog sample of the input signal to a previous analog sample of the input signal; and
a circuit configured to reconstruct the input signal based on an output of the positive edge detector, an output of the negative edge detector, and a clock signal, wherein a first sampler of the positive edge detector includes a positive edge detector switch coupled around a positive edge detector inverter, a first sampler of the negative edge detector includes a negative edge detector switch coupled around a negative edge detector inverter, and the first sampler of each of the positive edge detector and the negative edge detector is further coupled to a version of the clock signal that is delayed by a first amount and coupled to another version of the clock signal that is delayed by a second amount greater than the first amount.

13. The receiver of claim 12, wherein the circuit is configured to reconstruct the input signal further based on an output of the circuit.

14. The receiver of claim 12, wherein the first sampler of each of the positive edge detector and the negative edge detector is configured to sample the input signal based on the version of the clock signal.

15. The receiver of claim 12, wherein the first sampler of each of the positive edge detector and the negative edge detector further comprises a first capacitor coupled between the source of the input signal and a first node, and a capacitor coupled between the version of the clock signal that is delayed by the second amount and the first node, wherein the first node is further coupled to the switch and an input of the inverter.

16. The receiver of claim 12, wherein the switch is coupled to the version of the clock signal that is delayed by the first amount.

17. The receiver of claim 12, wherein the version of the clock signal which is coupled to the first sampler of the positive edge detector is substantially inverted relative to the version of the clock signal which is coupled to the first sampler of the negative edge detector.

18. The receiver of claim 12, wherein a frequency of the version of the clock signal is approximately half a frequency of the clock signal.

19. The receiver of claim 12, wherein the positive edge detector and the negative edge detector each comprise a first sampler, a second sampler, and a mux configured to output a value from one of the first sampler and the second sampler to the circuit.

20. The receiver of claim 12, wherein the positive edge detector and the negative edge detector are configured to sample the input signal approximately concurrently.

21. The receiver of claim 12, wherein the circuit comprises a two level digital integrator.

* * * * *